(12) United States Patent
Ha et al.

(10) Patent No.: US 7,973,873 B2
(45) Date of Patent: Jul. 5, 2011

(54) LIQUID CRYSTAL DISPLAY MODULE INCLUDING LIGHT-BLOCKING TAPE

(75) Inventors: Heon-Soo Ha, Gyeongbuk (KR); Hee-Ryoul Choi, Busan (KR)

(73) Assignee: LG Display Co., Ltd., Seoul (KR)

( * ) Notice: Subject to any disclaimer, the term of this patent is extended or adjusted under 35 U.S.C. 154(b) by 446 days.

(21) Appl. No.: 12/292,532

(22) Filed: Nov. 20, 2008

(65) Prior Publication Data

US 2009/0147174 A1    Jun. 11, 2009

(30) Foreign Application Priority Data

Dec. 7, 2007  (KR) ........................ 10-2007-0127188

(51) Int. Cl.
  *G02F 1/1333*  (2006.01)
  *G09F 13/04*  (2006.01)
(52) U.S. Cl. ............ 349/58; 349/56; 349/110; 349/113; 362/97.1; 362/97.2; 362/97.4
(58) Field of Classification Search .................... 349/58, 349/56, 110, 61, 112, 113, 122, 104, 64; 362/97.1, 97.2, 97.3, 97.4
See application file for complete search history.

(56) References Cited

U.S. PATENT DOCUMENTS

| | | | |
|---|---|---|---|
| 7,884,894 B2 * | 2/2011 | Cho et al. ........................ | 349/58 |
| 7,903,201 B2 * | 3/2011 | Cho et al. ........................ | 349/67 |
| 2008/0117351 A1 * | 5/2008 | Cho et al. ........................ | 349/58 |
| 2009/0147174 A1 * | 6/2009 | Ha et al. ........................ | 349/58 |

* cited by examiner

*Primary Examiner* — Brian M Healy
(74) *Attorney, Agent, or Firm* — Morgan, Lewis & Bockius LLP

(57) ABSTRACT

A liquid crystal display module includes a cover bottom, a reflection sheet over the cover bottom, a light guide plate over the reflection sheet and including at least one first protrusion, a lamp at a side of the light guide plate, optical sheets over the light guide plate, a support main surrounding the light guide plate and the optical sheets and including a projected part at an inner surface thereof, a liquid crystal panel disposed supported by the projected part of the support main, a light-blocking tape between the projected part and the liquid crystal panel, the light-blocking tape including at least one second protrusion corresponding to the at least one first protrusion, and a top cover covering edges of a front surface of the liquid crystal panel and combined with the support main and the cover bottom.

7 Claims, 6 Drawing Sheets

LIQUID CRYSTAL DISPLAY MODULE INCLUDING LIGHT-BLOCKING TAPE

The invention claims the benefit of Korean Patent Application No. 2007-0127188 filed in Korea on Dec. 7, 2007, which is hereby incorporated by reference for all purposes as if fully set forth herein.

BACKGROUND OF THE INVENTION

1. Field of the Invention

The invention relates to a liquid crystal display device, and more particularly, to a liquid crystal display module including a light-blocking tape.

2. Discussion of the Related Art

According to the rapid development in information technology, flat panel display (FPD) devices, such as liquid crystal display (LCD) devices, plasma display panels (PDPs), electroluminescent display (ELD) devices and field emission display (FED) devices, have been developed and have replaced cathode ray tubes (CRTs).

Among these devices, liquid crystal display (LCD) devices are most widely used for monitors of notebook computers, monitors of personal computers and televisions due to excellent moving images and high contrast ratio.

Liquid crystal display (LCD) devices use the optical anisotropy and polarization properties of liquid crystal molecules of a liquid crystal layer to produce an image. The liquid crystal molecules have long and thin shapes, and because of the optical anisotropy property, the polarization of light varies with the alignment direction of the liquid crystal molecules. The alignment direction of the liquid crystal molecules can be controlled by varying the intensity of an electric field applied to the liquid crystal layer. Accordingly, an LCD device includes two substrates spaced apart and facing each other and a liquid crystal layer interposed between the two substrates. Each of the two substrates includes an electrode on a surface facing the other of the two substrates. A voltage is applied to each electrode to induce an electric field between the electrodes and the alignment of the liquid crystal molecules as well as the transmittance of light through the liquid crystal layer is controlled by varying the intensity of the electric field.

The LCD devices require an additional light source because the LCD devices are not self-luminescent. Therefore, a backlight unit is disposed at a rear side of a liquid crystal panel and emits light into the panel, whereby discernible images can be displayed.

FIG. 1 is an exploded perspective view of schematically illustrating a liquid crystal display (LCD) module according to the related art. FIG. 2 is a cross-sectional view of illustrating a part of an LCD module according to the related art.

In FIG. 1 and FIG. 2, a related art LCD module includes a liquid crystal panel 10, a backlight unit 20, a support main 30, a top cover 40 and a cover bottom 50.

The liquid crystal panel 10 substantially displays images. The liquid crystal panel 10 includes first and second substrates 12 and 14 facing each other with a liquid crystal layer interposed therebetween. A printed circuit board 17 is attached and connected at a side of the liquid crystal panel 10 via connecting means 15.

The backlight unit 20 is disposed under the liquid crystal panel 10. The backlight unit 20 includes a lamp 24, a reflection sheet 22, a light guide plate 26, and a plurality of optical sheets 28. The lamp 24 is arranged along an edge of at least one side of the support main 30. The reflection sheet 22, which may be white-colored or silver-colored, is disposed over the cover bottom 40. The light guide plate 26 is disposed over the reflection sheet 22, and the lamp 24 is disposed at a side surface of the light guide plate 26. The plurality of optical sheets 28 are disposed over the light guide panel 26.

Side surfaces of the liquid crystal panel 10 and the backlight unit 20 are surrounded by the support main 30 having a rectangular frame shape. The top cover 40 covers edges of a front surface of the liquid crystal panel 10, and the cover bottom 50 covers a rear surface of the backlight unit 20. The top cover 40 and the cover bottom 50 are combined with the support main 30 to thereby constitute one-united body.

Lights emitted from the lamp 24 are incident on the side surface of the light guide plate 26 and are refracted toward the liquid crystal panel 10. The lights are changed to have uniform brightness and high qualities through the plurality of optical sheets 28 and are provided to the liquid crystal panel 10. Accordingly, the liquid crystal panel 10 displays images.

Meanwhile, the support main 30 prevents the light guide plate 26 from shaking due to outer impacts or vibrations by. More particularly, the light guide plate 26 includes protrusions 26a, and the support main 30 includes fixing grooves 32 corresponding to the protrusions 26a. The light guide plate 26 is prevented from shaking by inserting the protrusions 26a of the light guide plate 26 into the fixing grooves 32 of the support main 30.

However, light leakage may occur due to the protrusions 26a of the light guide plate 26.

More particularly, lights incident on the light guide plate 26 are totally-reflected several times inside the light guide plate 26 and uniformly scattered. At this time, some of the lights are scattered toward the protrusions 26a of the light guide plated 26.

Even though the protrusions 26a are inserted into and surrounded by the fixing grooves 32 of the support main 30, the support main 30 is molded from a resin that transmit some lights. Therefore, some of the lights are transmitted through the support main 30 corresponding to the protrusions 26a of the light guide plate 26 and are leaked outside.

As shown in FIG. 3, the light leakage is visible to the naked eye and causes decreases of the brightness and color uniformity. Accordingly, qualities of an LCD device are lowered.

SUMMARY OF THE INVENTION

Accordingly, the present invention is directed to a liquid crystal display module including a light-blocking tape that substantially obviate one or more of the problems due to limitations and disadvantages of the related art.

An advantage of the present invention is to provide a liquid crystal display module including a light-blocking tape that prevents light leakage due to protrusions of a light guide plate.

Another advantage of the present invention is to provide a liquid crystal display module including a light-blocking tape that improves the brightness and color uniformity of the device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display module includes a cover bottom, a reflection sheet over the cover bottom, a light guide plate over the reflection sheet and including at least one first protrusion, a lamp at a side of the light guide plate, optical sheets over the light guide plate, a support main surrounding the light guide plate and the optical sheets and including a projected part at an inner surface thereof, a liquid crystal panel disposed supported by the projected part of the support main, a light-blocking tape between the projected part and the liquid crystal panel, the light-blocking tape including at least one second protrusion corresponding to the at least one first protrusion, and a top cover covering edges of a front surface of the liquid crystal panel and combined with the support main and the cover bottom.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to embodiments of the present invention, examples of which are illustrated in the accompanying drawings.

The present invention may be applied to both of small-sized LCD devices, such as cell phones, DMB (digital multimedia broadcasting) appliances, PDA (personal digital assistants) and digital cameras, and large-sized LCD devices, such as televisions and computer monitors. Hereinafter, a small-sized LCD device, for example, less than 5 inches, will be described.

Figure 4:
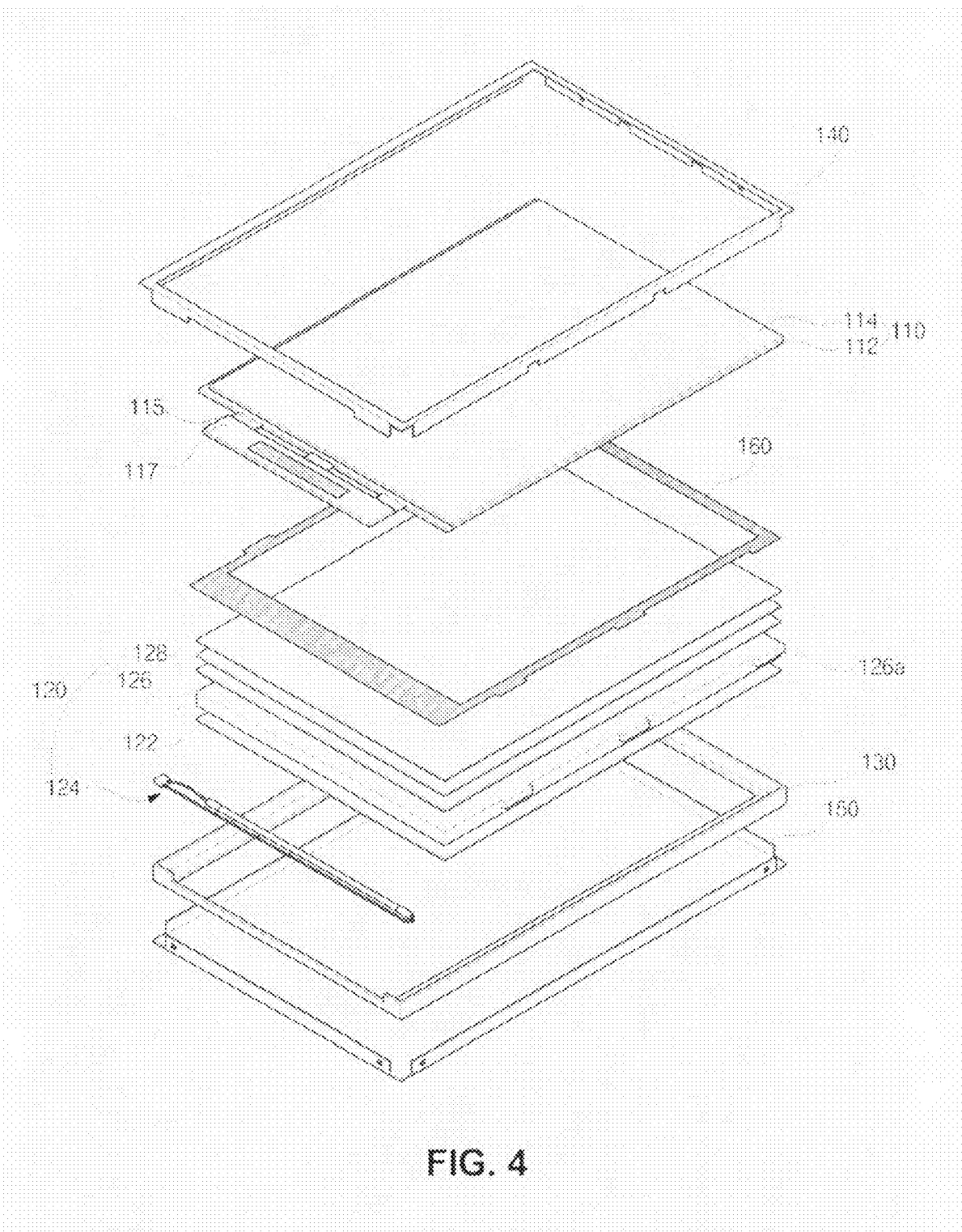
FIG. 4 is an exploded perspective view of schematically illustrating an LCD module according to an exemplary embodiment of the present invention.

FIG. 4 is an exploded perspective view of schematically illustrating an LCD module according to an exemplary embodiment of the present invention.

In FIG. 4, an LCD module includes a liquid crystal panel 110, a backlight unit 120, a support main 130, a top cover 140, and a cover bottom 150.

More particularly, the liquid crystal panel 110 displays images. The liquid crystal panel 110 includes first and second substrates 112 and 114 faced and attached to each other with a liquid crystal layer interposed therebetween. In an active matrix-type, although shown in the figure, gate lines and data lines are formed on an inner surface of the first substrate 112, which may be referred to as a lower substrate, and the gate lines and the data lines cross each other to define pixel regions. A thin film transistor (TFT) is formed at each crossing point of the gate and data lines, and a pixel electrode is connected to the thin film transistor at each pixel region. The pixel electrode may be formed of a transparent conductive material. The first substrate 112 including the gate lines, the date lines, the thin film transistor and the pixel electrode may be referred to as an array substrate.

A black matrix and red, green and blue color filter patterns are formed on an inner surface of the second substrate 114, which may be referred to as an upper substrate. The color filter patterns corresponding to the pixel regions, respectively. The black matrix surrounds each of the color filter patterns and covers the gate lines, the data lines, and the thin film transistors. A transparent common electrode is formed over the color filter patterns and the black matrix. The second substrate 114 including the black matrix, the color filter patterns and the common electrode may be referred to as a color filter substrate.

A printed circuit board 117 is attached to at least one side of the liquid crystal panel 110 via connecting means 115 such as flexible printed circuit boards. The printed circuit board 117 is bent toward a side surface of the support main 130 or a rear surface of the cover bottom 150 during a module process.

Although not shown in the figure, upper and lower alignment layers are interposed between the second substrate 114 and the liquid crystal layer and between the first substrate 112 and the liquid crystal layer, respectively. A seal pattern is formed along peripheries between the first and second substrates 112 and 114 to prevent liquid crystal materials of the liquid crystal layer from leaking.

Polarizers (not shown) are disposed at outer surfaces of the first and second substrates 112 and 114, respectively.

The backlight unit 120 is disposed under and provides light to the liquid crystal panel 110, so that variances in transmittance of the liquid crystal panel 110 are shown to the outside.

The backlight unit 120 includes a reflection sheet 122, a lamp 124, a light guide plate 126, and optical sheets 128. The lamp 124 is disposed along a length direction of at least one side of the support main 130, that is, along a direction parallel to the at least one side of the support main 130. The reflection sheet 122 is disposed over the cover bottom 150 and is white-colored or silver-colored. The light guide plate 126 is disposed over the reflection sheet 122, and the optical sheets 128 are disposed over the light guide plate 126.

In addition, the backlight unit 120 further includes a light-blocking tape 160 between the optical sheets 128 and the liquid crystal panel 110 such that light is prevented from leaking in an area excluding a display area of the liquid crystal panel 110.

Although shown in the figure, a lamp guide may be further included to guide the lamp 124. The lamp guide is opened at a side facing the light guide plate 126 and surrounds top, bottom and outer sides of the lamp 124 to protect the lamp 124 and to concentrate lights toward the light guide plate 126.

The lamp 124, which are used as a light source of the backlight unit 120, may be an external electrode fluorescent lamp or a cold cathode fluorescent lamp. A light-emitting diode lamp may be used for the lamp 124, and at this time, the lamp guide may be omitted.

The light guide plate 126 totally reflects lights emitted from the lamp 124 several times such that the lights move through the inside of the light guide plate 126 and are uniformly scattered. Accordingly, an initial flat light source is provided to the liquid crystal panel 110. To provide a uniform flat light source, the light guide plate 126 may include predetermined patterns at its rear surface.

A plurality of first protrusions 126a are formed along a length direction at both sides of the light guide plate 126, which may be longer sides of the light guide plate 126 than the other two sides, and are spaced apart from each other.

The reflection sheet 122 is disposed under the rear surface of the light guide plate 126. The reflection sheet 122 reflects lights passing through the rear surface of the light guide plate 126 toward the liquid crystal panel 110 to increase the brightness.

The optical sheets 128 over the light guide plate 126 include a diffuser sheet and at least one light-concentrating sheet. The optical sheets 128 diffuse or concentrate lights passing through the light guide plate 126 such that more uniform flat light source is provided to the liquid crystal panel 110.

The liquid crystal panel 110 and the backlight unit 120 may be combined together by the top cover 140, the support main 130 and the cover bottom 150 to constitute a liquid crystal display module.

The top cover 140 has a rectangular frame shape with an L-like shaped cross-section and covers edges of the front surface and side surfaces of the liquid crystal panel 110. The top cover 140 is opened at its front surface and exposes the front surface of the liquid crystal panel 110. Accordingly, images displayed by the liquid crystal panel 110 are shown.

The cover bottom 150, over which the liquid crystal panel 110 and the backlight unit 120 are disposed, has a rectangular plate shape, and four edges of the cover bottom 150 are bent perpendicularly toward the liquid crystal panel 110.

The support main 130 is disposed over the cover bottom 150 and has a rectangular frame shape to surround side surfaces of the liquid crystal panel 110 and the backlight unit 120. The support main 130 is combined with the top case 140 and the cover bottom 150.

Here, although not shown in FIG. 4, a projected part having a predetermined shape is formed at inner side surfaces of the support main 130. The light-blocking tape 160 is attached on the projected part, and, at the same time, the rear surface of the liquid crystal panel 110 is partially supported by the projected part. Fixing grooves are formed under the projected part and the first protrusions of the light guide plate 126 are inserted into the fixing grooves, so that the light guide plate 126 is prevented from moving.

Meanwhile, the light-blocking tape 160, which prevents lights from leaking in an area excluding a display region of the liquid crystal panel 110, has different widths corresponding to the first protrusions of the light guide plate 126. More detail description will be made with reference to FIG. 5.

Figure 5:
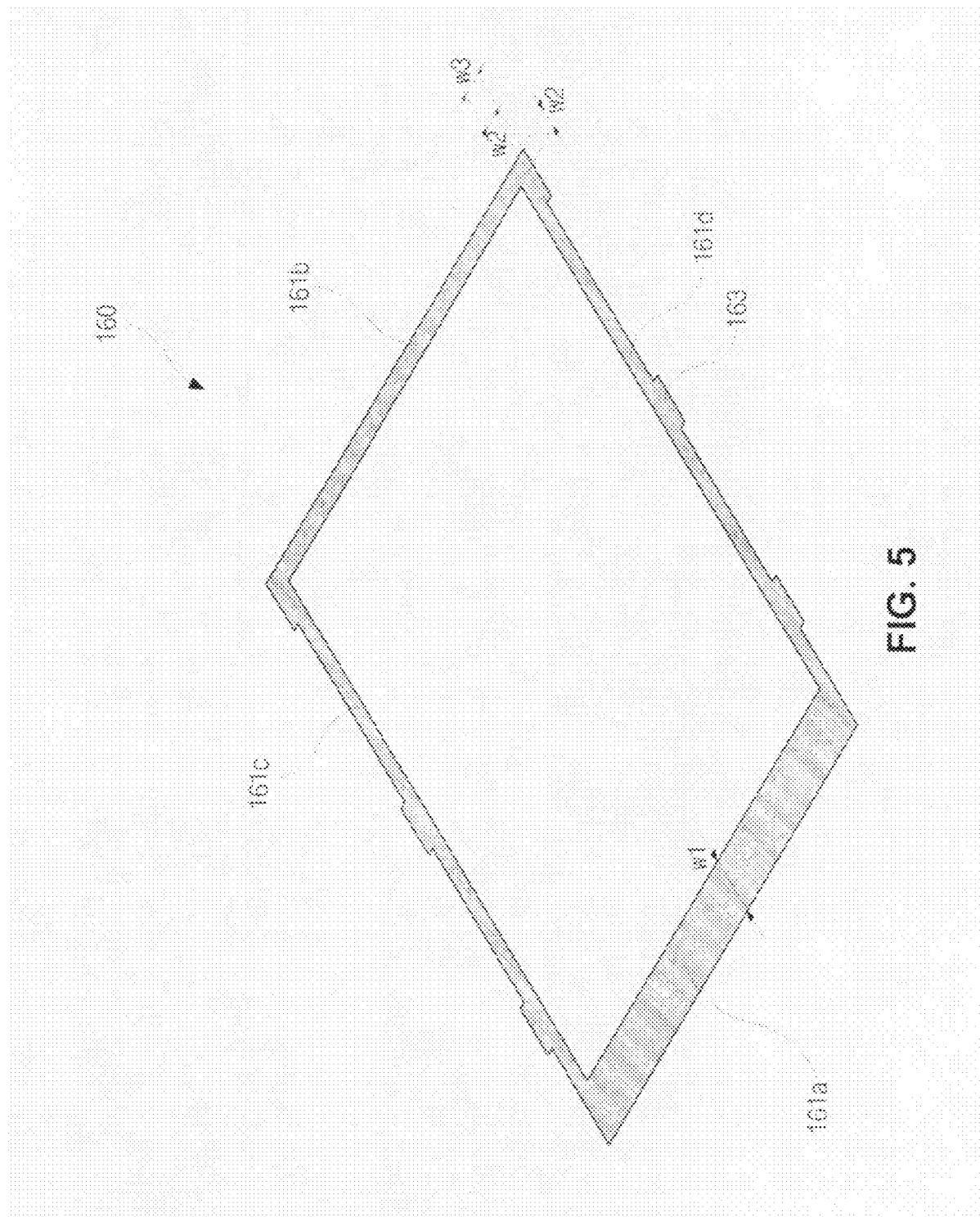
FIG. 5 is a perspective view of schematically illustrating a light-blocking tape according to an exemplary embodiment of the present invention.

FIG. 5 is a perspective view of schematically illustrating a light-blocking tape according to an exemplary embodiment of the present invention.

The light-blocking tape 160 may include a base film of a PET (Polyethylene Terephthalate) resin and an adhesive material layer beneath of the base film. The light-blocking tape 160 may be black so as to efficiently block lights.

In FIG. 5, the light-blocking tape 160 may have a rectangular frame shape and may include a first portion 161a, a second portion 161b, a third portion 161c and a fourth portion 161d. The first portion 161a corresponds to the printed circuit board 117 of the liquid crystal panel 110 of FIG. 4, and the second portion 161b faces the first portion 161a. The third and fourth portions 161c and 161d face each other and connect both ends of the first and second portions 161a and 161b.

The portions 161a, 161b, 161c and 161d of the light-blocking tape 160 have widths to cover peripheries of a rear surface of the liquid crystal panel 110 of FIG. 4. A first width w1 of the first portion 161a of the light-blocking tape 160 is wider than a second width w2 of the second, third and fourth portions 161b, 161c and 161d such that lights are prevented from leaking through the printed circuit board 117 of the liquid crystal panel 110 of FIG. 4.

Moreover, the third and fourth portions 161c and 161d include second protrusions 163 corresponding to the first protrusions 126a of the light guide plate 126 of FIG. 4. The second protrusions 163 have a third width w3 wider than the second width w2 of the light-blocking tape 160. The third width w3 may be about 1.5 to about 2 times wider than the second width w2.

Accordingly, light leakage due to the first protrusions 126a of the light guide plate 126 of FIG. 4 can be prevented by the light-blocking tape 160.

Figure 6:
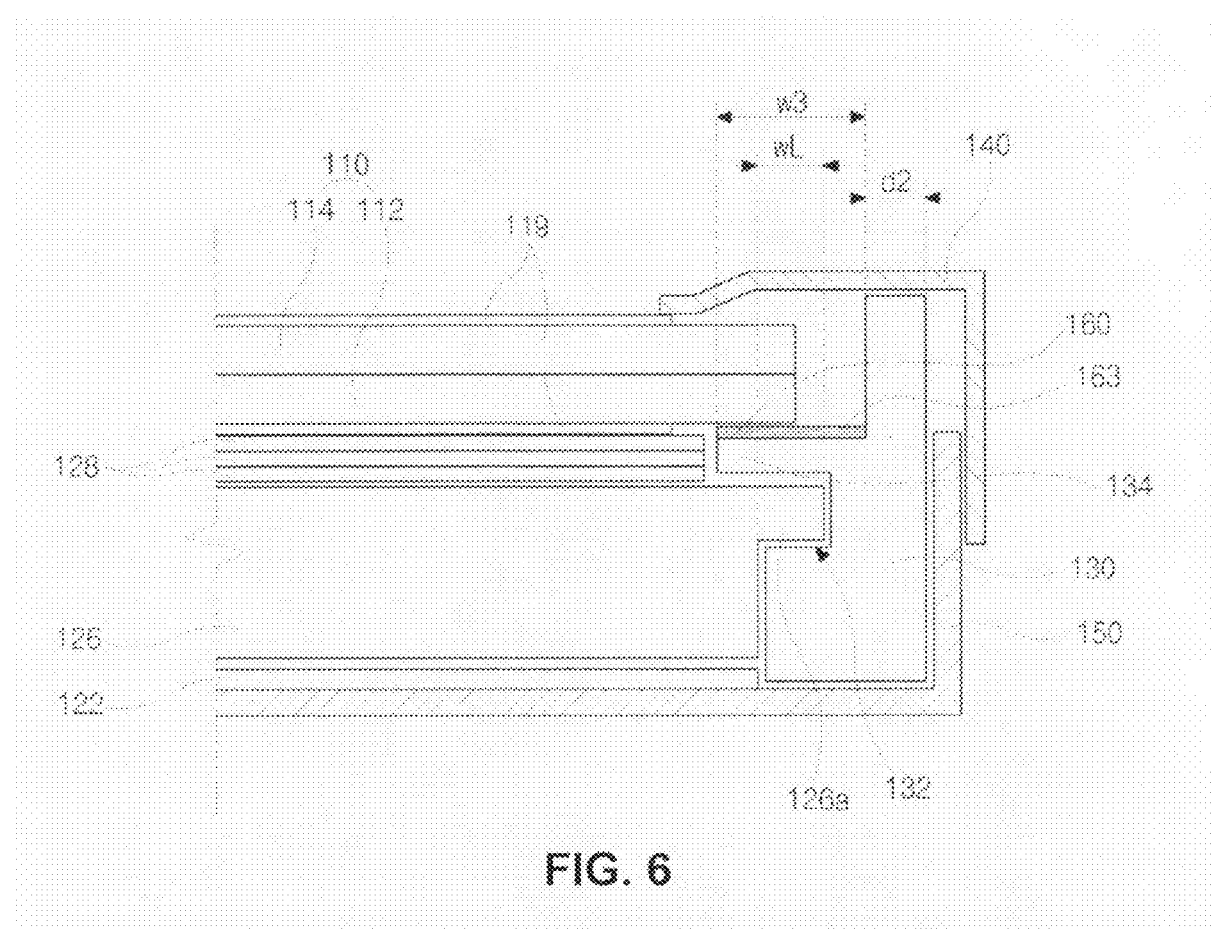
FIG. 6 is a cross-sectional view of schematically illustrating a part of an LCD module according to the present invention.

FIG. 6 is a cross-sectional view of schematically illustrating a part of an LCD module according to the present invention.

In FIG. 6, a liquid crystal panel 110 is disposed over a backlight unit. The liquid crystal panel 110 includes first and second substrates 112 and 114 and a liquid crystal layer interposed between the first and second substrates 112 and 114. The backlight unit includes a reflection sheet 122, a light guide plate 126, a lamp 124 of FIG. 4 at a side of the light guide plate 126, and a plurality of optical sheets 128 over the light guide plate 126. A support main 130 surrounds edges of the liquid crystal panel 110 and the backlight unit. A cover bottom 150 is disposed at a rear surface of the backlight unit and is connected to the support main 130. A top cover 140 covers edges of front and side surfaces of the liquid crystal panel 110. The top cover 150 is combined with the support main 130 and the cover bottom 150.

Polarizers 119 are attached at outer surfaces of the first and second substrates 112 and 114 of the liquid crystal panel 110.

Here, first protrusions 126a of the light guide plate 126 are inserted into fixing grooves 132 of the support main 130, and the light guide plate 126 is fixed. A projected part 134 protruded from an inner side surface of the support main 130 is formed over the fixing grooves 132 of the support main 130, and a light-blocking tape 160 is attached on an upper surface of the projected part 134 to prevent lights passing through the first protrusions 126a of the light guide plate 126 from leaking in an area excluding a display region of the liquid crystal panel 110.

The light-blocking tape 160 includes second protrusions 163 corresponding to the first protrusions 126a of the light guide plate 126. A width w3 of a portion of the light-blocking tape 160 including the second protrusions 163, which is the third widths of FIG. 5, is wider than a width wL of the first protrusions 126a of the light guide plate 126. The second protrusions 163 entirely cover the first protrusions 126a of the light guide plate 126.

The width w3 of the portion including the second protrusions 163 is wider than the width wL of the first protrusions 126a of the light guide plate 126. A difference between the width w3 and the width wL may be about 0.5 to about 1.0 time as wide as the width wL. That is, the width w3 may be about 1.5 to about 2.0 times as wide as the width wL.

Lights emitted from the lamp 124 of FIG. 4 and incident on the inside of the light guide plate 126 are totally-reflected several times and are uniformly scattered in the inside of the light guide plate 126. At this time, even though some of the lights scattered toward the first protrusions 126a of the light guide plate 126 pass through the support main 130 corresponding to the first protrusions 126a, some of the lights are blocked by the second protrusions 163 over the first protrusions 126a, and there is no light leakage.

Here, the light-blocking tape 160 may be attached such that the second protrusions 163 are deeply disposed toward the inner surface of the support main 130, that is, an end of each of the second protrusions 163 is disposed as close as possible to the outer surface of the support main 130. Accordingly, light leakage due to the first protrusions 126a of the light guide plate 126 can be more efficiently prevented.

Figure 1:
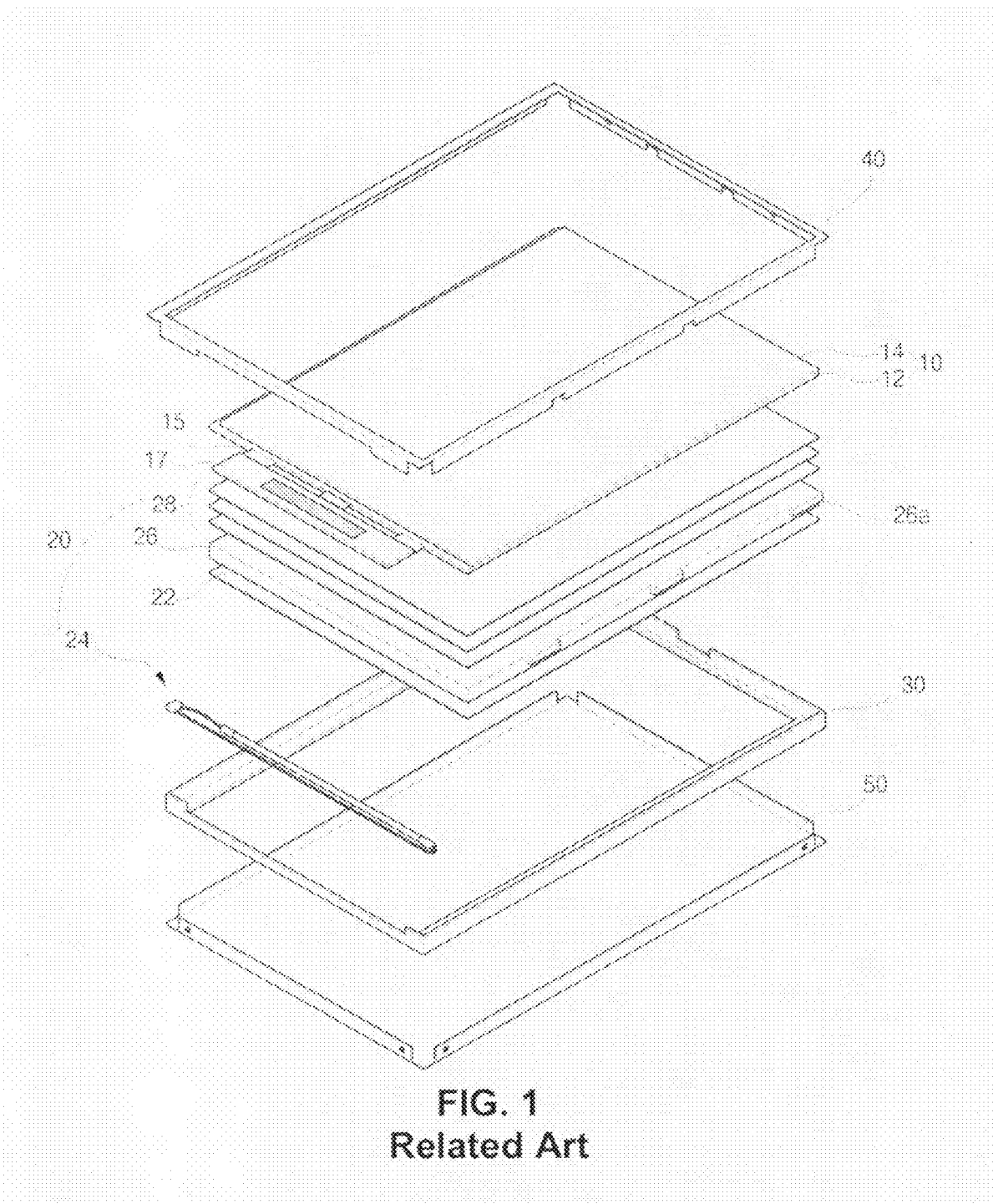
FIG. 1 is an exploded perspective view of schematically illustrating a liquid crystal display (LCD) module according to the related art.
Figure 2:
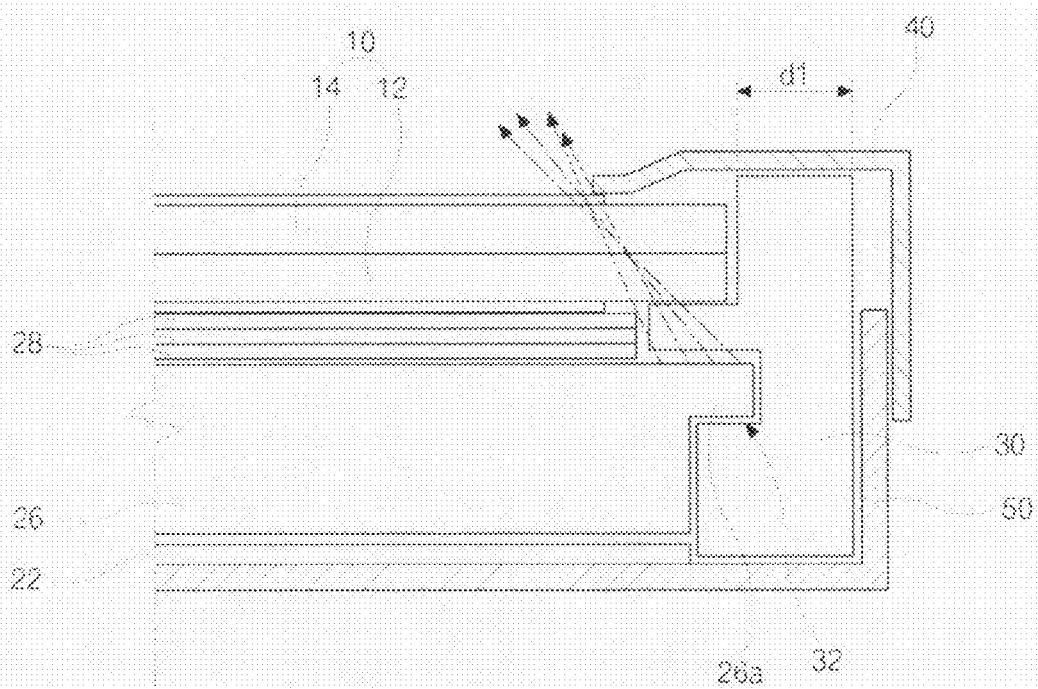
FIG. 2 is a cross-sectional view of illustrating a part of an LCD module according to the related art.
Figure 3:
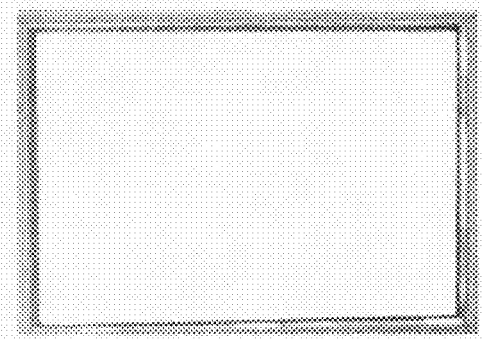
FIG. 3 is a picture of illustrating an LCD module with light leakage according to the related art.

To do this, the projected part 134 of the support main 130 is lengthened due to the second protrusions 163 of the light-blocking tape 160. Therefore, it is beneficial to narrow a thickness d2 of an upper part of the support main 130 above the projected part 134, on which the light-blocking tape 160 is attached, as compared with a thickness d1 of the support main 30 of FIG. 2 of the related art, so that a volume of the LCD module is not changed.

Especially, by narrowing not a total thickness of the support main 130 but the thickness d2 of the upper part of the support main 130 corresponding to the second protrusions 163, it is desired that there is no influence on a total rigidity of the support main 130.

Here, a width of the projected part 134 may be changed depending on positions. That is, the width of the projected part 134, at which the second protrusions 163 are attached, beneficially, is about 1.2 to about 2 times as wide as the width of the projected part 134, at which the second protrusions 163 are not attached. At this time, the thickness of the upper part of the support main 130 also may be varied according to the width of the projected part 134.

Meanwhile, the first protrusions 126a of the light guide plate 126 may be differently positioned along the side surface of the light guide plate 126, and thus the light guide plate 126 can be prevented from moving upward and downward, too. That is, one of the first protrusions 126a may be disposed at an upper part of the side surface of the light guide plate 126, and another of the first protrusions 126b may be disposed at a lower part of the side surface of the light guide plate 126. Accordingly, the first protrusions 126a may be disposed in a zigzag shape along the side surface of the light guide plate 126. Moreover, the fixing grooves 132 of the support main 130 may be formed to correspond to the first protrusions 126a. Here, the first protrusions 126a may have a half thickness of the light guide plate 126.

Figure 7:
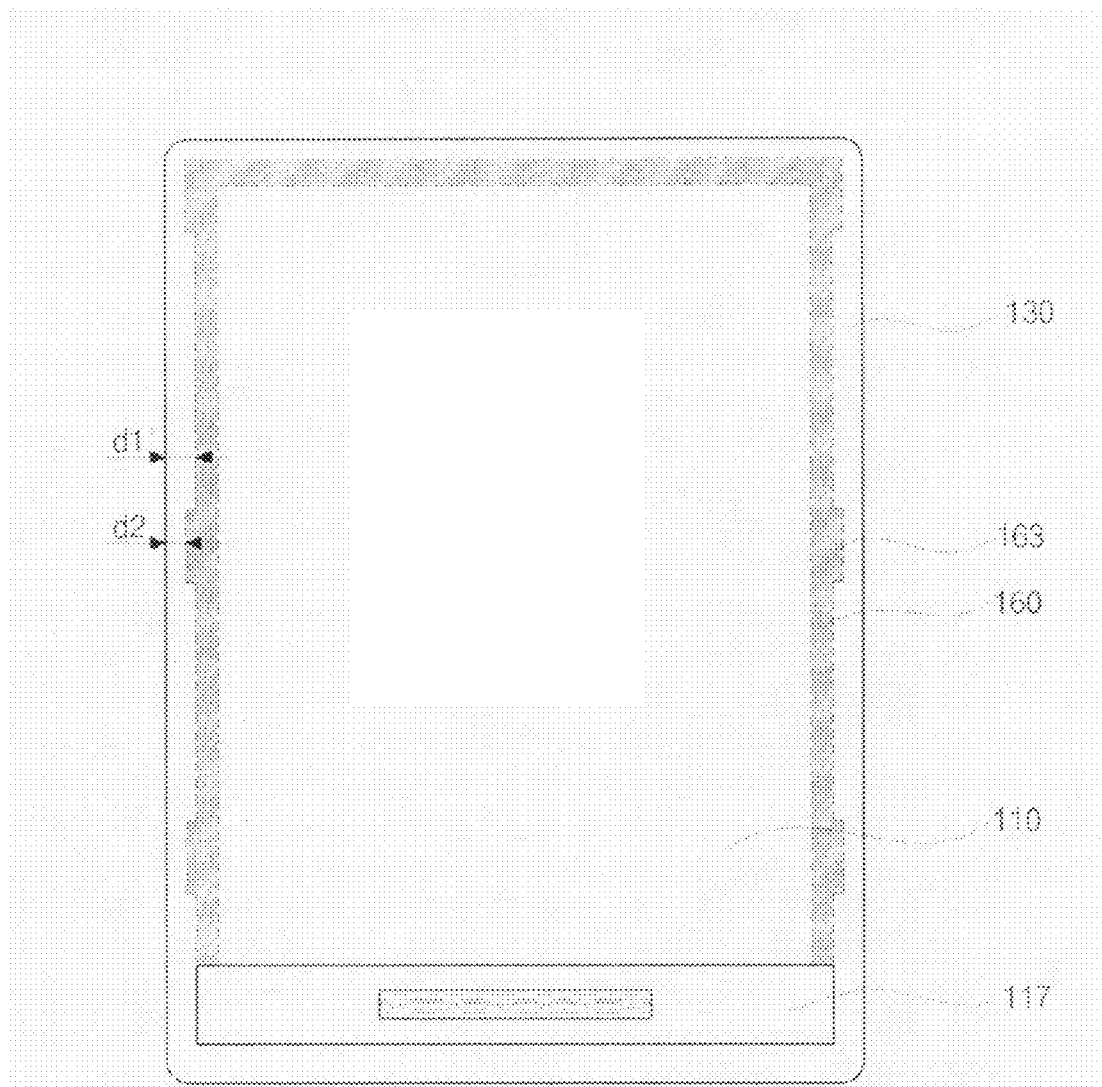
FIG. 7 is a plan view of schematically illustrating an LCD module excluding a top cover according to the present invention.

FIG. 7 is a plan view of schematically illustrating an LCD module excluding a top cover according to the present invention.

In FIG. 7, a support main 130 surrounds edges of a liquid crystal panel 110, and a light-blocking tape 160 of a rectangular frame is attached at a rear surface of the liquid crystal panel 110 along the edges of the liquid crystal panel 110. The liquid crystal panel 110 includes a printed circuit board 117 at a side thereof. The printed circuit board 117 overlaps a portion of the light-blocking tape 160.

At this time, an upper part of the support main 130 may have different thicknesses according to positions. More particularly, the upper part of the support main 130 may have a thickness d2 corresponding to the second protrusions 163 of the light-blocking tape 160, which is thinner than a thickness d1' of the upper part of the support main 130 in other positions.

Here, although not shown in the figure, a plurality of optical sheets 128 of FIG. 6 are disposed under the liquid crystal panel 110, and the light-blocking tape 160 is interposed between the liquid crystal panel 110 and the plurality of optical sheets 128 of FIG. 6. In addition, a light guide plate 126 of FIG. 6 including first protrusions 126a of FIG. 6 is disposed under the plurality of optical sheets 128 of FIG. 6. A lamp 124 of FIG. 4 is disposed at a side of the light guide plate 126 of FIG. 6, and a reflection sheet 122 of FIG. 6 is disposed under the light guide plate 126 of FIG. 6 over a cover bottom 150 of FIG. 6.

Figure 8:
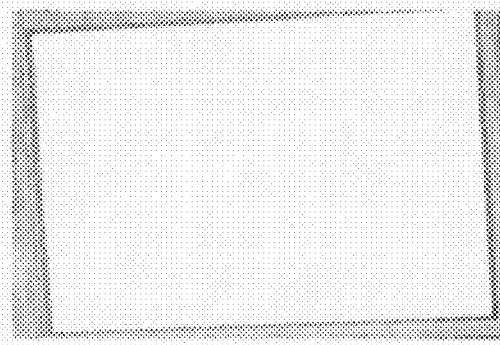
FIG. 8 is a picture of illustrating an LCD module without light leakage according to the present invention.

FIG. 8 is a picture of illustrating an LCD module without light leakage according to the present invention.

In FIG. 8, since the light-blocking tape 150 includes the second protrusions 163 corresponding to the first protrusions 126a of FIG. 6 of the light guide plate 126 of FIG. 6, there is no light leakage along the edges of the liquid crystal panel 110 of FIG. 7.

In the present invention, light leakage due to the protrusions of the light guide plate can be prevented by the protrusions of the light-blocking tape. Therefore, the brightness and color uniformity of the LCD device can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a cover bottom;
   a reflection sheet over the cover bottom;
   a light guide plate over the reflection sheet and including at least one first protrusion;
   a lamp at a side of the light guide plate;
   optical sheets over the light guide plate;
   a support main surrounding the light guide plate and the optical sheets and including a projected part at an inner surface thereof;
   a liquid crystal panel disposed supported by the projected part of the support main;
   a light-blocking tape between the projected part and the liquid crystal panel, the light-blocking tape including at least one second protrusion corresponding to the at least one first protrusion; and
   a top cover covering edges of a front surface of the liquid crystal panel and combined with the support main and the cover bottom.

2. The module according to claim 1, wherein the light-blocking tape has a rectangular frame shape and has a width such that the light-blocking tape partially overlaps a rear surface of the liquid crystal panel.

3. The module according to claim 2, wherein the at least one second protrusion has a width 1.5 to 2.0 times wider than the at least one first protrusion.

4. The module according to claim 2, wherein the liquid crystal panel includes a printed circuit board at a side thereof, and the light-blocking tape includes first, second, third and fourth portions, wherein the first portion corresponds to the printed circuit board and has a wider width than the second, third and fourth portions.

5. The module according to claim 1, wherein the at least one first protrusion includes a plurality of first protrusions, and the plurality of first protrusions are spaced apart from each other along a side surface of the light guide plate.

6. The module according to claim 5, wherein the plurality of first protrusions are disposed in a zigzag shape.

7. The module according to claim 1, wherein a width of the projected part at which the at least one second protrusion is attached is about 1.2 to about 2 times as wide as a width of the projected part at which the at least one second protrusion is not attached.

* * * * *